(12) United States Patent
Uozumi et al.

(10) Patent No.: US 7,637,100 B2
(45) Date of Patent: Dec. 29, 2009

(54) AUTOMATIC TRANSMISSION AND PRODUCTION METHOD OF IMPELLER HUB FOR AUTOMATIC TRANSMISSION

(75) Inventors: Shingo Uozumi, Nishio (JP); Hiroshi Kato, Kariya (JP); Yasunari Muranaka, Okazaki (JP); Kazuhiko Sugita, Anjo (JP); Naoki Ito, Nishio (JP)

(73) Assignee: Aisin AW Co., Ltd, Tokyo (JP)

( * ) Notice: Subject to any disclaimer, the term of this patent is extended or adjusted under 35 U.S.C. 154(b) by 249 days.

(21) Appl. No.: 11/693,368

(22) Filed: Mar. 29, 2007

(65) Prior Publication Data
US 2007/0292269 A1    Dec. 20, 2007

(30) Foreign Application Priority Data
Mar. 30, 2006    (JP)    ............................. 2006-094082

(51) Int. Cl.
*F16D 33/18*    (2006.01)
*F16H 41/30*    (2006.01)

(52) U.S. Cl. ........................... 60/330; 60/364; 409/132; 29/557

(58) Field of Classification Search ................... 60/330, 60/341, 364; 29/557, 889; 409/131, 132
See application file for complete search history.

(56) References Cited

U.S. PATENT DOCUMENTS 3,545,883 A * 12/1970 Iijima ........................... 60/367
3,901,030 A * 8/1975 Wonn ........................... 60/341
4,186,557 A * 2/1980 Arai et al. ..................... 60/361
5,580,196 A * 12/1996 Thompson ................... 408/230
5,603,448 A * 2/1997 Woerner et al. ........... 228/114.5
5,876,161 A * 3/1999 Ikola et al. ................... 409/132
6,357,977 B1 * 3/2002 Momochi et al. ........... 409/132
6,439,811 B1 * 8/2002 Wardell ....................... 408/230
7,290,987 B1 * 11/2007 Morin .......................... 60/330

FOREIGN PATENT DOCUMENTS

| JP | 57189568 A | 11/1982 |
| JP | 61177790 A | 8/1986 |
| JP | 8-285036 A | 11/1996 |
| JP | 11-132160 | 5/1999 |
| JP | 2000-179644 A | 6/2000 |
| JP | 2004-144140 A | 5/2004 |

* cited by examiner

*Primary Examiner*—Thomas E Lazo
(74) *Attorney, Agent, or Firm*—Sughrue Mion, PLLC (57) ABSTRACT

In an automatic transmission, a lip portion of an oil seal can be prevented from riding up reliably when an impeller hub is inserted into the oil seal so as to be attached thereto, even when the lip portion is provided with a tightening margin. The impeller hub is attached to the oil seal from the lip portion side of the oil seal, with an end portion thereof in which a notch is formed. The impeller hub has a first chamfer portion formed in a bottom portion outer peripheral edge portion of the notch as an inclined surface that decreases radially in an axial direction of the impeller hub toward the end portion of the impeller hub, and an axial distance of the first chamfer portion from the bottom portion outer peripheral edge portion increases from both end sides of a circumferential direction of the notch toward a circumferential direction central portion of the notch.

8 Claims, 4 Drawing Sheets

|      | C1 | C2 | C3 | B1 | B2  | F1 |
|------|----|----|----|----|-----|----|
| P    |    |    |    |    |     |    |
| REV  |    |    | O  |    | O   |    |
| N    |    |    |    |    |     |    |
| 1ST  | O  |    |    |    | (O) | O  |
| 2ND  | O  |    |    | O  |     |    |
| 3RD  | O  |    | O  |    |     |    |
| 4TH  | O  | O  |    |    |     |    |
| 5TH  |    | O  | O  |    |     |    |
| 6TH  |    | O  |    | O  |     |    |

AUTOMATIC TRANSMISSION AND PRODUCTION METHOD OF IMPELLER HUB FOR AUTOMATIC TRANSMISSION

CROSS-REFERENCE TO RELATED PATENT APPLICATIONS

This application claims priority from Japanese Patent Application No. 2006-094082, filed on Mar. 30, 2006, in the Japanese Patent Office, the disclosure of which is incorporated herein in its entirety by reference.

TECHNICAL FIELD

Apparatuses and methods consistent with the present invention relate to an automatic transmission having a speed change apparatus enclosed in a transmission case, and a manufacturing method for an impeller hub used therein.

BACKGROUND ART

An automatic transmission has a speed change apparatus for shifting between a plurality of shift speeds by engaging and disengaging a plurality of friction engagement elements constituted by clutches and brakes. A pump is provided that is driven to rotate via a torque converter. By using oil discharged by the oil pump, hydraulic servos of the clutches and brakes are controlled, and the friction engagement elements of the clutches and brakes are lubricated together with gear elements of a speed change gear unit and so on. Conventionally, an inner rotor of the oil pump engages with a notch formed at one end of an impeller hub that is integrally connected to a pump impeller of the torque converter, and thus the inner rotor is driven to rotate integrally with the pump impeller.

In a type of automatic transmission, as described in Japanese Patent Application Publication No. JP-A-11-132160, for example, an engaging groove (notch) 12a that engages with a driving projecting portion (projection) 17a projecting from the inner periphery of an inner rotor 17 of an oil pump 11 is formed at one end of an impeller sleeve (impeller hub) 12 connected to a pump impeller 13. Engagement between the driving projecting portion (projection) 17a and the engaging groove (notch) 12a is performed by passing the impeller sleeve (impeller hub) 12 through an oil seal attached to an oil pump housing (oil pump body) 15a, and a dust lip for preventing foreign matter from infiltrating a transmission case is provided at one end of the oil seal.

DISCLOSURE OF THE INVENTION

Incidentally, in an automatic transmission such as that described in Japanese Patent Application Publication No. JP-A-11-132160, the dust lip of the oil seal is preferably fitted onto the outer peripheral surface of the impeller sleeve (impeller hub) 12 with a tightening margin to prevent the infiltration of fine foreign matter reliably, but for the following reason, it is difficult to provide the dust lip with a tightening margin.

The direction in which the impeller sleeve (impeller hub) 12 is attached to the oil seal must be set such that attachment is performed from the dust lip side of the oil seal with the engaging groove (notch) 12a leading. Hence, if the dust lip is provided with a tightening margin, the dust lip penetrates the engaging groove (notch) 12a when the impeller sleeve (impeller hub) 12 is inserted into the oil seal, and when the penetrating dust lip is subsequently lifted onto the outer periphery of the impeller sleeve (impeller hub) 12 from the bottom portion of the engaging groove (notch) 12a, the dust lip may occasionally become caught on the bottom portion of the engaging groove (notch) 12a so as to ride up (fold up).

More specifically, when the impeller sleeve (impeller hub) 12 is inserted into the oil seal, the dust lip penetrates the engaging groove (notch) 12a, whereupon the penetrating dust lip is lifted onto the outer peripheral surface of the impeller sleeve (impeller hub) 12 all at once along the width dimension of the notch, or in other words the dimension of the notch in the circumferential direction of the impeller sleeve (impeller hub) 12. As a result, the dust lip part corresponding to the width dimension rides up in the opposite direction so as to become fitted onto the outer peripheral surface of the impeller sleeve (impeller hub) 12. Once the dust lip rides up and is fitted, it is difficult for the dust lip to return to a normal state under its own elastic force alone if a tightening margin is provided.

SUMMARY OF THE INVENTION

Illustrative, non-limiting embodiments of the present invention overcome the disadvantages described above and other disadvantages. Also, the present invention is not required to overcome the disadvantages described above and the other disadvantages, and an illustrative, non-limiting embodiment of the present invention may not overcome any of the disadvantages.

An aspect of the invention is to provide an automatic transmission and a manufacturing method for an impeller hub used therein, with which a lip portion of an oil seal can be prevented from riding up reliably when the impeller hub is attached and inserted into the oil seal, even when the lip portion is provided with a tightening margin.

According to an exemplary embodiment of the present invention, an automatic transmission comprises a transmission case, a speed change apparatus enclosed in the transmission case, a torque converter having a pump impeller that is connected to and rotated by a drive source and a turbine runner that is connected to an input shaft of the speed change apparatus and rotated in accompaniment with the rotation of the pump impeller, and an oil pump that is driven to rotate by the drive source via the torque converter so as to discharge oil. A drive gear of the oil pump is connected to the pump impeller and fitted into a notch formed in an end portion of an impeller hub that extends toward the speed change apparatus in an axial direction thereof. The impeller hub is supported rotatably on an oil pump wall which is fixed to the transmission case and encloses the drive gear, an oil seal including a lip portion fitted to the impeller hub is mounted between an inner peripheral surface of the oil pump wall and an outer peripheral surface of the impeller hub, and the impeller hub is inserted into the oil seal from the lip portion side with an end portion in which the notch is formed leading and such that the lip portion has a tightening margin relative to the impeller hub. The impeller hub has a first chamfer portion formed in a bottom portion outer peripheral edge portion of the notch as an inclined surface that decreases radially in an axial direction of the impeller hub toward the end portion of the impeller hub, and an axial distance of the first chamfer portion from the bottom portion outer peripheral edge portion increases from both end sides of a circumferential direction of the notch toward a circumferential direction central portion of the notch.

In accordance with further aspects of an exemplary embodiment, a second chamfer portion connected to the first chamfer portion may be continuously formed on two end outer peripheral edge portions of the notch.

A bearing for supporting the impeller hub is disposed radially between the inner peripheral surface of the oil pump wall and the outer peripheral surface of the impeller hub and axially between the pump impeller and the notch, and a chamfer width of the first chamfer portion in the axial direction of the impeller hub is set between $1/10$ and $1/50$ of a diameter of the impeller hub in a groove center of the notch.

According to a further exemplary embodiment of the present invention, a manufacturing method is provided for an impeller hub used in an automatic transmission including a transmission case, a speed change apparatus enclosed in the transmission case, a torque converter having a pump impeller that is connected to and rotated by a drive source and a turbine runner that is connected to an input shaft of the speed change apparatus and rotated in accompaniment with the rotation of the pump impeller, and an oil pump that is driven to rotate by the drive source via the torque converter so as to discharge oil, wherein a drive gear of the oil pump is connected to the pump impeller and fitted into a notch formed in an end portion of an impeller hub that extends toward the speed change apparatus in an axial direction thereof. The impeller hub is supported rotatably on an oil pump wall which is fixed to the transmission case and encloses the drive gear, an oil seal including a lip portion fitted to the impeller hub is mounted between an inner peripheral surface of the oil pump wall and an outer peripheral surface of the impeller hub, and the impeller hub is inserted into the oil seal from the lip portion side with an end portion in which the notch is formed leading and such that the lip portion has a tightening margin relative to the impeller hub. By moving a rotary blade having a conical surface on a tip end portion thereof relative to the impeller hub at an incline of a predetermined angle to an axis of the impeller hub, a first chamfer portion is fashioned in a bottom portion outer peripheral edge portion of the notch by the conical surface of the rotary blade such that an axial distance thereof from the bottom portion outer peripheral edge portion increases from both end sides of a circumferential direction of the notch toward a circumferential direction central portion of the notch.

In accordance with a further aspect, by moving the rotary blade relative to the impeller hub in an axial direction of the impeller hub, the second chamfer portion is fashioned on two end outer peripheral edge portions of the notch in the impeller hub by a cylindrical portion outer periphery of the rotary blade, and at a terminal end portion of the relative motion of the rotary blade, the first chamfer portion is fashioned continuously in the bottom portion outer peripheral edge portion of the notch in the impeller hub by the conical surface of the rotary blade.

An angle of incline of the rotary blade relative to the axis of the impeller hub may be set between 40 and 80°, and a cone angle of the conical surface of the rotary blade may be set between 130 and 170°, for example.

In accordance with an exemplary embodiment, the impeller hub has a first chamfer portion formed in a bottom portion outer peripheral edge portion of the notch as an inclined surface that decreases radially in an axial direction of the impeller hub toward the end portion of the impeller hub, and an axial distance of the first chamfer portion from the bottom portion outer peripheral edge portion increases from both end sides of a circumferential direction of the notch toward a circumferential direction central portion of the notch, and therefore, when the impeller hub is inserted into the oil seal from the lip portion side with an end portion in which the notch is formed leading and such that the lip portion has a tightening margin relative to the impeller hub, and the part of the lip portion that penetrates the notch is lifted from the bottom portion of the notch onto the outer peripheral surface of the impeller hub, the lip portion penetrating the notch is lifted onto the outer peripheral surface of the impeller hub so as to be scooped up gradually from the two sides of the notch by the first chamfer portion. As a result, riding up of the lip portion may be prevented reliably, and a reliable seal action may be secured over the long term.

A second chamfer portion connected to the first chamfer portion may be continuously formed on the two end outer peripheral edge portions of the notch, and therefore, the lip portion penetrating the notch may be lifted smoothly onto the outer peripheral surface of the impeller hub by the second chamfer portions via the first chamfer portion.

In accordance with a further exemplary aspect, a chamfer width of the first chamfer portion in the axial direction of the impeller hub may be set between $1/10$ and $1/50$ of the diameter of the impeller hub in the groove center of the notch, and therefore the first chamfer portion may be provided with the chamfer width required to prevent riding up of the lip portion reliably, and does not obstruct disposal of the bearing for supporting the impeller hub and so on.

By moving a rotary blade having a conical surface on a tip end portion thereof relative to the impeller hub at an incline of a predetermined angle to an axis of the impeller hub, the first chamfer portion is fashioned in the bottom portion outer peripheral edge portion of the notch by the conical surface of the rotary blade such that an axial distance thereof from the bottom portion outer peripheral edge portion increases from both end sides of a circumferential direction of the notch toward a circumferential direction central portion of the notch, and therefore the first chamfer portion can be fashioned easily using the conical surface of the rotary blade.

By moving the rotary blade relative to the impeller hub in the axial direction of the impeller hub, the second chamfer portion is fashioned on the two end outer peripheral edge portions of the notch in the impeller hub by a cylindrical portion outer periphery of the rotary blade, and the first chamfer portion is fashioned continuously in the bottom portion outer peripheral edge portion of the notch in the impeller hub by the conical surface of the rotary blade at a terminal end portion of the relative motion of the rotary blade. Hence, the first and second chamfer portions can be fashioned extremely efficiently simply by moving the rotary blade relative to the impeller hub in the axial direction of the impeller hub.

The angle of incline of the rotary blade relative to the axis of the impeller hub may be set between 40 and 80°, and a cone angle of the conical surface of the rotary blade may be set between 130 and 170°. Thus, the first chamfer portion, which is formed as an inclined surface that becomes smaller radially in the axial direction of the impeller hub toward the tip end of the impeller hub and has an axial distance from the bottom portion outer peripheral, edge portion that increases from both end sides of the circumferential direction of the notch toward the circumferential direction central portion of the notch, can be fashioned accurately.

DETAILED DESCRIPTION OF EXEMPLARY, NON-LIMITING EMBODIMENTS

Figure 2:
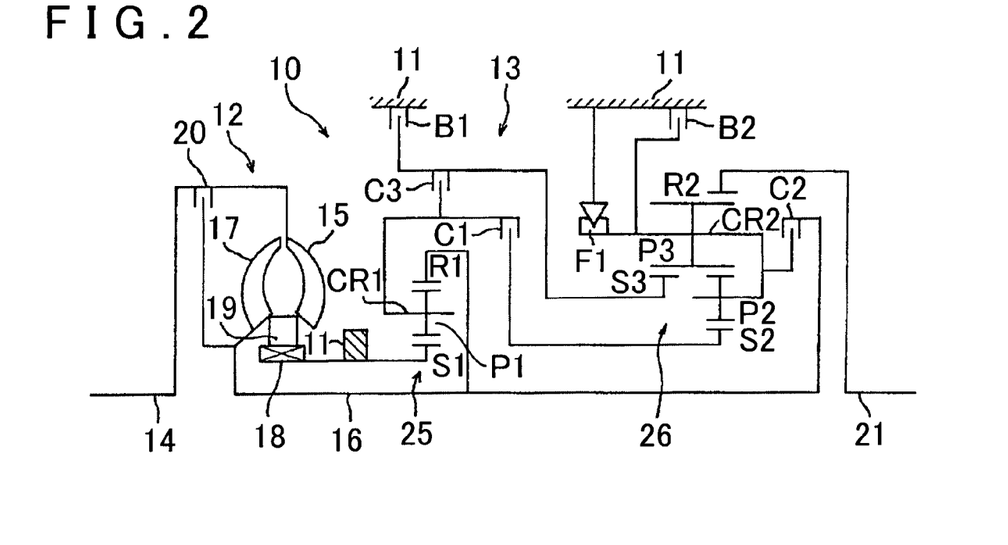
FIG. 2 is a conceptual diagram of an automatic transmission according to an exemplary embodiment of the present invention.

An exemplary embodiment of the present invention will be described below on the basis of the drawings. FIG. 2 shows an automatic transmission 10 suitable for use in a front engine, rear drive type vehicle, for example. The automatic transmission 10 has a torque converter 12 and a speed change apparatus 13 provided inside a transmission case 11 attached to a vehicle body. The torque converter 12 is constituted by a pump impeller 15 connected to a drive shaft 14 to which the rotation of an engine, not shown in the drawing, is output, a turbine runner 17 rotated in accompaniment with the rotation of the pump impeller 15 and connected to an input shaft 16 for inputting the rotation into the speed change apparatus 13, a stator 19 mounted on a one-way clutch 18, a lockup clutch 20 that is engaged when a predetermined condition is established so as to connect the drive shaft 14 and the input shaft 16, and so on. The speed change apparatus 13 changes the speed of the rotation input from the input shaft 16, and outputs the rotation to an output shaft 21 connected to a drive wheel.

Note that the input shaft 16 and output shaft 21 of the automatic transmission 10 are coaxial with an advancement direction of the vehicle. Further, the torque converter 12 is disposed on the front side of the vehicle advancement direction, and the output shaft 21 is disposed on the rear side of the vehicle advancement direction. In this exemplary embodiment, the torque converter 12 side in the axial direction of the automatic transmission 10 (the front side of the vehicle advancement direction) will be referred to as the "front", and the output shaft 21 side (the rear side of the vehicle advancement direction) will be referred to as the "rear".

The speed change apparatus 13 is constituted by the input shaft 16, a speed reducing planetary gear 25, a planetary gear set 26 constituted by a plurality of planetary gears, the output shaft 21, and first through third clutches C1 to C3 and first and second brakes B1, B2 serving as friction engagement elements, all of which are supported successively on the same axis within the transmission case 11.

The speed reducing planetary gear 25, which reduces the speed of the rotation of the input shaft 16 and transfers the rotation to the planetary gear set 26, is constituted by a sun gear S1 which is fixed to the transmission case 11 at all times and thereby rotationally restricted, a ring gear R1 connected directly to the input shaft 16, and a carrier CR1 for supporting a pinion P1 that meshes with the sun gear S1 and ring gear R1.

The planetary gear set 26 is constituted by a Ravigneaux type gear set combining a single pinion planetary gear and a double pinion planetary gear, for example.

A small diameter first sun gear S2 of the planetary gear set 26 is connected disengagably to the carrier CR1 of the speed reducing planetary gear 25 by the first clutch C1, while a large diameter second sun gear S3 is connected disengagably to the transmission case 11 by the first brake B1 and connected disengagably to the carrier CR1 of the speed reducing planetary gear 25 by the third clutch C3. A short pinion P2 is meshed with the first sun gear S2, a long pinion P3 is meshed with the second sun gear S3, and the short pinion P2 and long pinion P3 are meshed with each other. The short pinion P2 and long pinion P3 are respectively supported rotatably on a direct connection structure carrier CR2. A ring gear R2 is meshed with the long pinion P3 and connected to the output shaft 21 as an output element.

The carrier CR2 is connected disengagably to the input shaft 16 by a second clutch C2. Further, the carrier CR2 is connected disengagably to the transmission case 11 by the second brake B2, and rotation thereof in one direction is restricted by a one-way clutch F1 disposed in series with the second brake B2.

By selectively engaging and disengaging the first through third clutches C1 to C3 and the first and second brakes B1, B2, and selectively connecting or fixing the input shaft 16, the output shaft 21, and the various elements of the speed reducing planetary gear 25 and planetary gear set 26, the automatic transmission 10 structured as described above is capable of establishing gear ratios for six forward speeds and one reverse speed.

Figure 3:
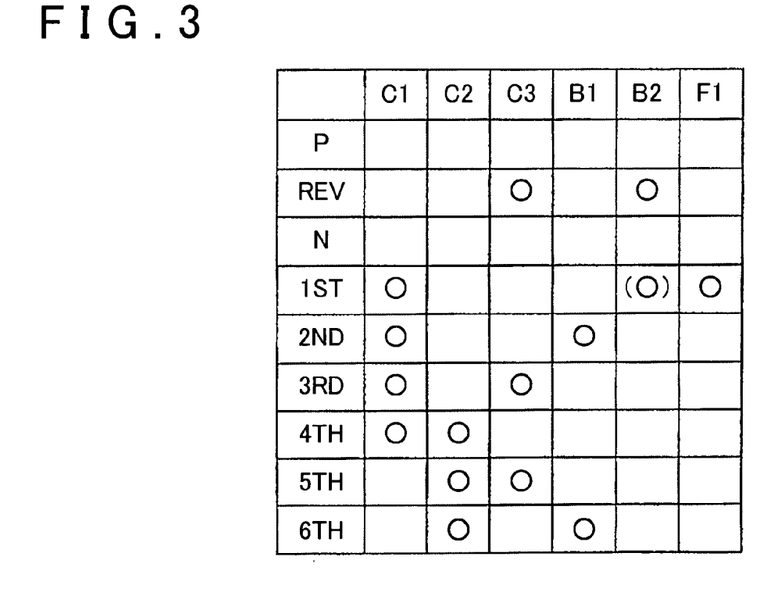
FIG. 3 is a view showing states of engagement of a clutch and a brake in each gear speed of the automatic transmission shown in FIG. 1.

Next, an operation of the automatic transmission 10 structured as described above will be described. In FIG. 3, reference numeral P denotes a parking range, reference numeral REV denotes a reverse range, reference numeral N denotes a neutral range, $1^{st}$ denotes a first speed of a forward range, $2^{nd}$ denotes a second speed of the forward range, $3^{rd}$ denotes a third speed of the forward range, $4^{th}$ denotes a fourth speed of the forward range, $5^{th}$ denotes a fifth speed of the forward range, and $6^{th}$ denotes a sixth speed of the forward range. Note that each range as described above is selected by operating speed selecting means such as a shift lever.

Also in FIG. 3, when a circle is marked in the clutch and brake columns corresponding to each gear speed, this indicates that the clutch or brake is engaged, and when nothing is marked, this indicates a released state.

In the first speed of the forward range, when the first clutch C1 is engaged, input rotation from the input shaft 16 is input into the ring gear R1 of the speed reducing planetary gear 25, whereupon the reduced speed rotation reduced in speed by the speed reducing planetary gear 25 is input into the first sun gear S2 of the planetary gear set 26 by the carrier CR1 via the first clutch C1. At the same time, the rotation of the carrier CR2 is restricted by the one-way clutch F1, and as a result, rotation reduced in speed by a maximum speed reducing ratio is output to the output shaft 21 from the ring gear R2.

In the second speed of the forward range, when the first clutch C1 and the first brake B1 are engaged, input rotation from the input shaft 16 is input into the ring gear R1 of the speed reducing planetary gear 25, whereupon the reduced speed rotation reduced in speed by the speed reducing planetary gear 25 is input into the first sun gear S2 of the planetary gear set 26 by the carrier CR1 via the first clutch C1. At this time, the second sun gear S3 is held stationary as the first brake B1 is engaged, and as a result, rotation reduced in speed by a smaller speed reducing ratio than the speed reducing ratio of the first speed is output to the output shaft 21 from the ring gear R2.

In the third speed of the forward range, when the first clutch C1 and the third clutch C3 are engaged, input rotation from the input shaft 16 is input into the ring gear R1 of the speed reducing planetary gear 25, whereupon the reduced speed rotation reduced in speed by the speed reducing planetary gear 25 is input into the first sun gear S2 of the planetary gear set 26 by the carrier CR1 via the first clutch C1, and input into the second sun gear S3 by the carrier CR1 via the third clutch C3, whereby the planetary gear set 26 enters a state of direct connection. Hence, the reduced speed rotation input into the first and second sun gears S2, S3 is transferred as is to the ring gear R2 such that rotation reduced in speed by a smaller speed reducing ratio than the speed reducing ratio of the second speed is output to the output shaft 21 from the ring gear R2.

In the fourth speed of the forward range, when the first clutch C1 and the second clutch C2 are engaged, input rotation from the input shaft 16 is input into the ring gear R1 of the speed reducing planetary gear 25, whereupon the reduced speed rotation reduced in speed by the speed reducing planetary gear 25 is input into the first sun gear S2 of the planetary gear set 26 by the carrier CR1 via the first clutch C1, and the input rotation from the input shaft 16 is input into the carrier CR2 via the second clutch C2. Hence, rotation reduced in speed by an intermediate speed reducing ratio between the rotation input into the first sun gear S2 and the rotation input into the carrier CR2, or in other words a smaller speed reducing ratio than the speed reducing ratio of the third speed, is output to the output shaft 21 from the ring gear R2.

In the fifth speed of the forward range, when the second clutch C2 and the third clutch C3 are engaged, input rotation from the input shaft 16 is input into the ring gear R1 of the speed reducing planetary gear 25, whereupon the reduced speed rotation reduced in speed by the speed reducing planetary gear 25 is input into the second sun gear S3 of the planetary gear set 26 via the third clutch C3, and the input rotation from the input shaft 16 is input into the carrier CR2 via the second clutch C2. As a result, rotation that is slightly increased in speed relative to the rotation of the input shaft 16 is output to the output shaft 21 from the ring gear R2.

In the sixth speed of the forward range, when the second clutch C2 and the first brake B1 are engaged, input rotation from the input shaft 16 is input into the carrier CR2 of the planetary gear set 26 via the second clutch C2. At this time, the second sun gear S3 is fixed as the first brake B1 is engaged, and therefore rotation that is further increased in speed relative to the rotation of the input shaft 16 is output to the output shaft 21 from the ring gear R2.

In the reverse range, when the third clutch C3 and second brake B2 are engaged, input rotation from the input shaft 16 is input into the ring gear R1 of the speed reducing planetary gear 25, whereupon the reduced speed rotation reduced in speed by the speed reducing planetary gear 25 is input into the second sun gear S3 of the planetary gear set 26 via the third clutch C3. At this time, the carrier CR2 is fixed as the second brake B2 is engaged, and therefore rotation that is reversed relative to the rotation of the input shaft 16 is output to the output shaft 21 from the ring gear R2.

Figure 1:
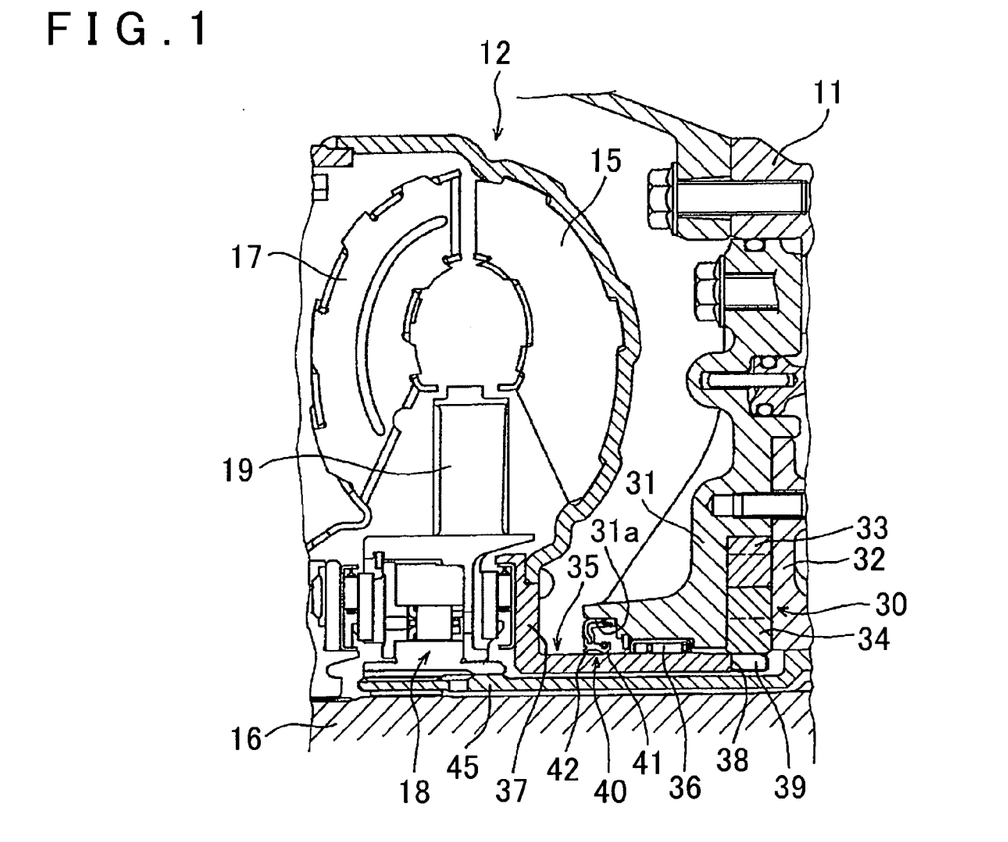
FIG. 1 is a sectional view of main parts of an automatic transmission, illustrating an exemplary embodiment of the present invention.

Next, the main parts of the automatic transmission 10 will be described. In FIG. 1, reference numeral 30 is an oil pump of the automatic transmission 10. The oil pump 30 is constituted by an oil pump body 31 fixed to the transmission case 11, an oil pump wall formed from an oil pump cover 32 for sealing the oil pump body 31, a driven gear (outer rotor) 33 fitted rotatably onto the oil pump body 31, and a drive gear (inner rotor) 34 accommodated in the inner periphery of the driven gear 33.

A cylindrical impeller hub 35 is supported rotatably on the inner periphery of the oil pump body 31 via a needle bearing 36 serving as a bearing. Note that a bush or the like may be used as a bearing. A flange portion 37 is formed at a front end portion of the impeller hub 35, and the flange portion 37 is integrally connected to the pump impeller 15 of the torque converter 12. A notch 38 is opened in a rear end portion of the impeller hub 35, and a projection 39 projecting from the inner periphery of the drive gear 34 is engaged with the notch 38.

Thus, when the engine rotates, the drive gear 34 is driven to rotate integrally with the impeller hub 35, and as a result, oil is discharged by the oil pump 30.

Note that in FIG. 1, reference numeral 45 denotes a stator shaft fixed to the transmission case 11. The stator shaft 45 penetrates the oil pump body 31 so as to extend in the axial direction of the speed change apparatus 13, and the aforementioned input shaft 16 is supported rotatably within the stator shaft 45.

Figure 4:
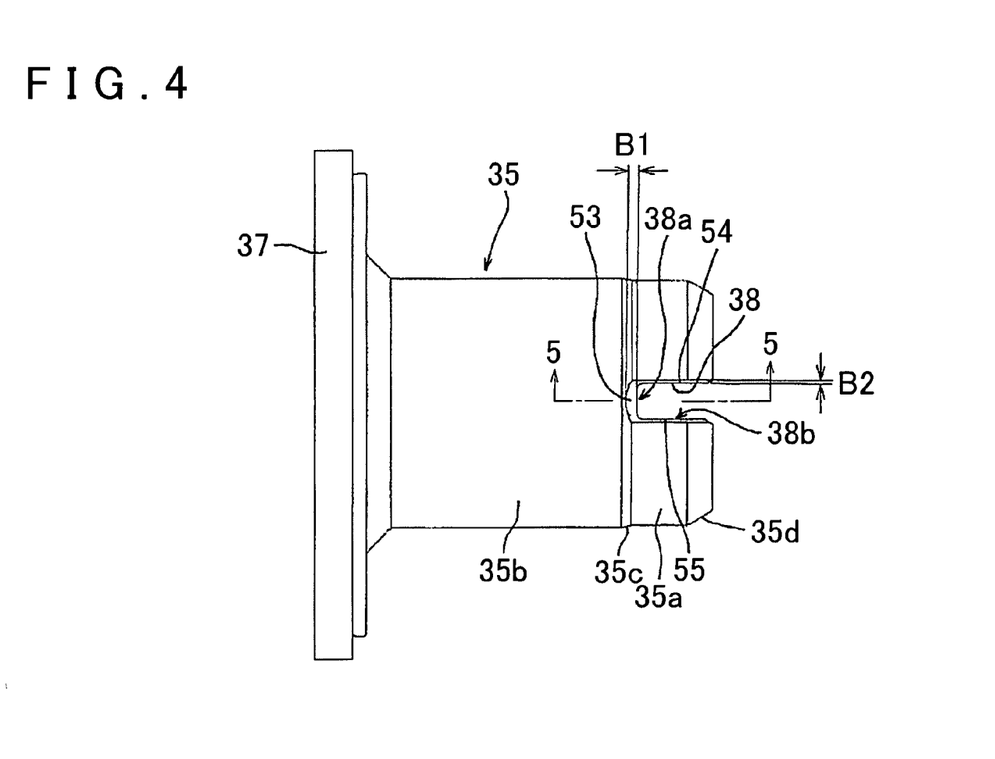
FIG. 4 is a view showing an outer form of an impeller hub.

As shown in detail in FIG. 4, the notch 38 opened in the rear end portion of the impeller hub 35 is formed in the axial direction of the impeller hub 35 (the axial direction of the speed change apparatus 13), and the notch 38 is provided in a pair opposing the diametrical direction of the impeller hub 35 (the radial direction of the speed change apparatus 13). A rear end outer peripheral portion 35a of the impeller hub 35, in which the notch 38 is formed, is formed with a slightly smaller diameter than a front end outer peripheral portion 35b, and the small diameter rear end outer peripheral portion 35a and large diameter front end outer peripheral portion 35b are connected smoothly by an inclined portion 35c formed in an axial position slightly toward the front side of a bottom portion of the notch 38. Note that the bottom portion of the notch 38 is the base surface of the notch 38 having a width in the radial direction. Further, a tapered surface 35d is formed on an outer peripheral edge portion at the rear end portion of the impeller hub 35 in which the notch 38 is opened.

As shown in FIG. 1 (and FIG. 6), a boss portion 31a is formed on the front end side inner periphery of the oil pump body 31, and an oil seal 40 is attached to the boss portion 31a adjacent to the needle bearing 36. The oil seal 40 is provided with a main seal portion 41 that is pressed against the outer peripheral surface (a front end outer peripheral portion 38b) of the impeller hub 35 by spring force, and a secondary seal portion 42, or in other words a dust lip 42, for preventing the infiltration of foreign matter. The dust lip 42 is fitted onto the outer peripheral surface (the front end outer peripheral portion 38b) of the impeller hub 35 with a tightening margin. As shown by the arrow in FIG. 6, the impeller hub 35 is inserted from the dust lip 42 side of the oil seal 40 with the side on which the notch 38 opens (a chamfer 35d side) leading. The impeller hub 35 then penetrates the inner periphery of the main seal portion 41 of the oil seal 40 and the needle bearing 36, and is thereby attached such that the notch 38 engages with the projection 39 on the drive gear 34.

Figure 6:
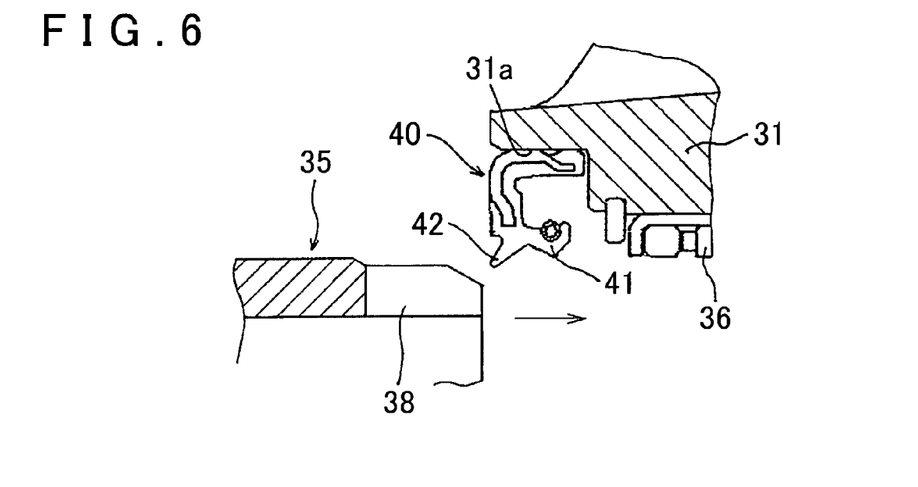
FIG. 6 is a view showing an exemplary manner in which the impeller hub is attached to an oil seal.

Hence, when attaching the impeller hub 35, the impeller hub 35 is inserted from the dust lip (secondary seal portion) 42 side with the notch 38 side tip end thereof leading, and therefore, if the dust lip 42 is provided with a tightening margin and an edge portion on the bottom portion of the notch 38 is simply formed with a cut away chamfer, the dust lip 42, having penetrated the notch 38 in the impeller hub 35 during insertion of the impeller hub 35 into the oil seal 40, may be attached in an upwardly folding manner when lifted onto the outer peripheral surface of the impeller hub 35 from the bottom portion of the notch 38.

To prevent the dust lip 42 of the oil seal 40 from riding up reliably under the attachment conditions described above, the present invention implements measures on the shape of the chamfer forming the bottom portion of the notch 38 such that when the dust lip 42 is lifted onto the outer peripheral surface of the impeller hub 35 from the bottom portion of the notch 38 during insertion of the impeller hub 35, the dust lip 42 can be lifted so as to be scooped up gradually from both sides of the notch 38. The specific structure of these measures will be described below on the basis of FIGS. 4 and 5.

Figure 5:
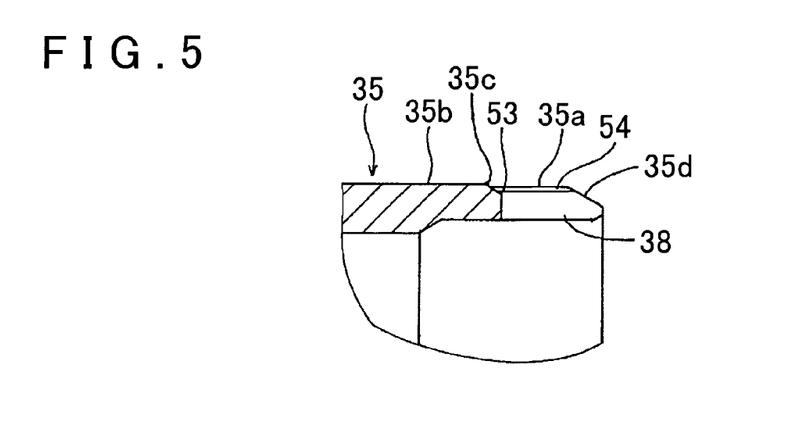
FIG. 5 is an enlarged sectional view cut along a line 5-5 in FIG. 4.

As shown in FIGS. 4 and 5, a first chamfer portion 53 is formed on the bottom portion outer peripheral edge portion 38a of the notch 38 in the impeller hub 35, or in other words on the outer peripheral edge portion of the bottom portion in the axial direction of the notch 38, and second chamfer portions 54, 55 are formed linearly on the two end outer peripheral edge portions 38b of the notch 38, or in other words on the outer peripheral edge portions of the two end portions in the circumferential direction of the notch 38.

As shown in FIG. 5, the first chamfer portion 53 takes a sectional form that is parallel to the axial direction of the impeller hub 35 passing through the groove center of the notch 38, and forms an inclined surface cut so as to rise gradually upward from the bottom portion of the notch 38 toward the inclined portion 35c on the outer peripheral surface of the impeller hub 35. The cross-section of the first chamfer portion 53 also forms a recessed curved surface that is at right angles to the axial direction of the impeller hub 35.

In other words, the first chamfer portion 53 is formed on the bottom portion outer peripheral edge portion 38a of the notch 38 as an inclined surface that becomes radially smaller in the axial direction of the impeller hub 35 toward the end portion of the impeller hub 35, and is formed such that an axial distance thereof from the bottom portion outer peripheral edge portion 38a increases toward a circumferential direction central portion of the notch 38 from both end sides of the circumferential direction of the notch 38.

The two end portions of the first chamfer portion 53 are connected smoothly and continuously to the linear portions of the second chamfer portions 54, 55 formed on the two end outer peripheral edge portions 38b of the notch 38.

Hence, the first chamfer portion 53 formed on the bottom portion outer peripheral edge portion 38a of the notch 38 is an inclined surface that becomes radially smaller toward the end portion of the impeller hub 35 in the axial direction of the impeller hub 35, and the axial distance thereof from the bottom portion outer peripheral edge portion 38a increases toward the circumferential direction central portion of the notch 38 from both end sides of the circumferential direction of the notch 38. Therefore, as shown by the arrow in FIG. 6, even if a part of the dust lip 42, which has a tightening margin, corresponding to the notch 38 in the impeller hub 35 penetrates the notch 38 due to its elastic force when the notch 38 passes the dust lip 42 of the oil seal 40, a predetermined width (corresponding to the notch width) of the dust lip 42 penetrating the notch 38 is not lifted onto the outer peripheral surface of the impeller hub 35 from the bottom portion of the notch 38 all at once during the lifting operation. More specifically, the predetermined width of the dust lip 42 penetrating the notch 38 is initially scooped up by the first chamfer portion 53 at a site corresponding to the two sides of the notch 38, and as the impeller hub 35 advances into the oil seal 40, the site of the dust lip 42 that is scooped up by the first chamfer portion 53 moves gradually in the direction of the groove center of the notch 38. As a result, riding up of the dust lip 42 having a tightening margin can be prevented reliably even when the impeller hub 35 is inserted from the dust lip 42 side with the tip end thereof on the notch 38 side leading.

Next, a method of performing chamfering to fashion the first and second chamfer portions 53, 54, 55 as described above will be described on the basis of FIG. 7.

Figure 7:
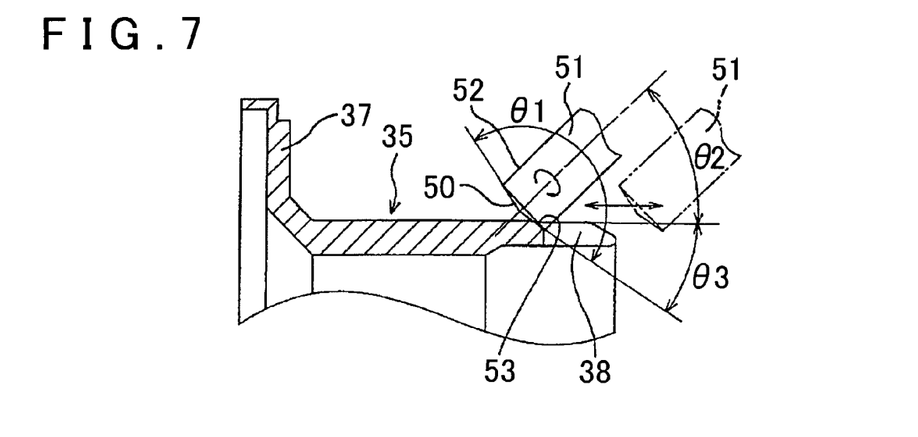
FIG. 7 is a view showing an exemplary method of fashioning a chamfer portion of an impeller hub.

As shown in FIG. 7, to fashion the first and second chamfer portions 53, 54, 55, an end mill 51 serving as a rotary blade having a conical surface 50 with a cone angle θ1 on its tip end is used. The end mill 51 is moved relative to the impeller hub 35 in a parallel direction to the axis thereof with the conical surface 50 facing the bottom portion of the notch 38 and inclined relative to the axis of the impeller hub 35 by a predetermined angle θ2. In so doing, the second chamfer portions 54, 55 having arc-shaped cross-sections are cut simultaneously into the two end outer peripheral edge portions 38b of the notch 38 by a cylindrical portion outer periphery 52 at the tip end portion of the end mill 51, and at the end of this stroke, the first chamfer portion 53 having the form described above is cut into the bottom portion outer peripheral edge portion 38a of the notch 38 by the conical surface 50 at the tip end of the end mill 51.

In this exemplary embodiment, the employed end mill 51 has a diameter of φ20 mm, for example, and the cone angle of the conical surface 50 is 160° (θ1). The end mill 51 is inclined by 45° (θ2) from the axis of the impeller hub 35, whereupon the first chamfer portion 53 and the second chamfer portions 54, 55 are cut into the bottom portion outer peripheral edge portion 38a and the two end outer peripheral edge portions 38b of the notch 38. As a result, an incline angle θ3 of the first chamfer portion 53 in the groove center of the notch 38 is 35°, for example, and hence the first chamfer portion 53, which forms an inclined surface that becomes radially smaller toward the end portion of the impeller hub 35 in the axial direction of the impeller hub 35 and has an axial distance from the bottom portion outer peripheral edge portion 38a that increases toward a circumferential direction central portion of the notch 38 from both end sides of the circumferential direction of the notch 38, can be fashioned easily and accurately.

The first chamfer portion 53 having this shape can be fashioned similarly even when the cone angle θ1 of the conical surface 50 on the end mill 51 is varied in accordance with the incline angle θ2 of the end mill 51 relative to the axis of the impeller hub 35, and the first chamfer portion 53 can be fashioned in an appropriate shape when the incline angle θ2 is within a range of 40 to 80°, for example, and the cone angle θ1 is within a range of 130 to 170°, for example.

As shown in FIG. 4, a chamfer width (maximum chamfer width) B1 of the first chamfer portion 53 in the groove center of the notch 38 may be at least 1.3 times greater than a circumferential direction chamfer width B2 of the second chamfer portions 54, 55 and may be within a dimension range of 1/10 to 1/50 of the diameter of the impeller hub 35.

Thus, when the impeller hub 35 is inserted into the oil seal 40 from the side of the dust lip (secondary seal portion) 42 having a tightening margin with the tip end of the impeller hub 35 on the notch 38 side leading, a circumferential part of the dust lip 42 enters the notch 38 in the impeller hub 35, but when the dust lip 42 is lifted onto the outer peripheral surface of the impeller hub 35 from the bottom wall portion of the notch 38, the dust lip 42 can be lifted so as to be scooped up gradually from both sides of the notch 38, and therefore riding up of the dust lip 42 can be prevented reliably.

The incline angle θ3 of the first chamfer portion 53 in the groove center of the notch 38 may be as small (gentle) as possible, but when the incline angle θ3 is too small, the chamfer width (maximum chamfer width) B1 of the first chamfer portion 53 in the axial direction of the impeller hub 35 becomes too large in the groove center of the notch 38, thereby approaching the outer peripheral surface region of the impeller hub 35 supported by the needle bearing 36, and therefore, as described above, the chamfer width B1 should be held within a dimension range of 1/10 to 1/50 of the diameter of the impeller hub 35.

Figure 8:
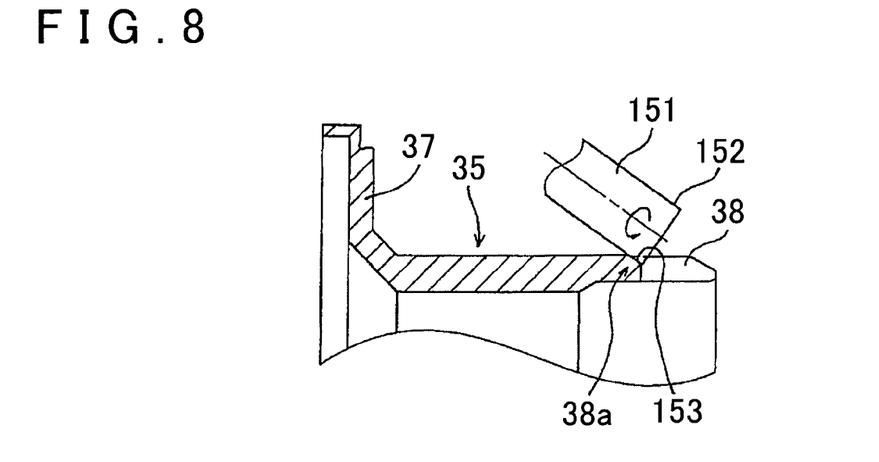
FIG. 8 is a view showing another exemplary method of fashioning a chamfer portion of an impeller hub.

FIG. 8 shows another exemplary embodiment of the present invention, in which the first and second chamfer portions formed on the bottom portion outer peripheral edge portion 38a and the two end outer peripheral edge portions 38b of the notch 38 in the impeller hub 35 are formed using a different fashioning method to that of the first exemplary embodiment.

A cylindrical end mill 151 not having a conical blade on its tip end is disposed in the opposite direction to the first exemplary embodiment, or in other words inclined from the flange portion 37 side of the impeller hub 35 toward the open end of the notch 38, and a cylindrical portion outer periphery 152 at the tip end of the end mill 151 is used to form a first chamfer portion 153 having a similar shape to that of the embodiment described above in the bottom portion outer peripheral edge portion 38a of the notch 38. Note that by moving the end mill 151 relative to the impeller hub 35 in a parallel direction to the axis, the second chamfer portions can be fashioned by the cylindrical portion outer periphery 152 on the two end outer peripheral edge portions in a similar manner to the embodiment described above.

Figure 9:
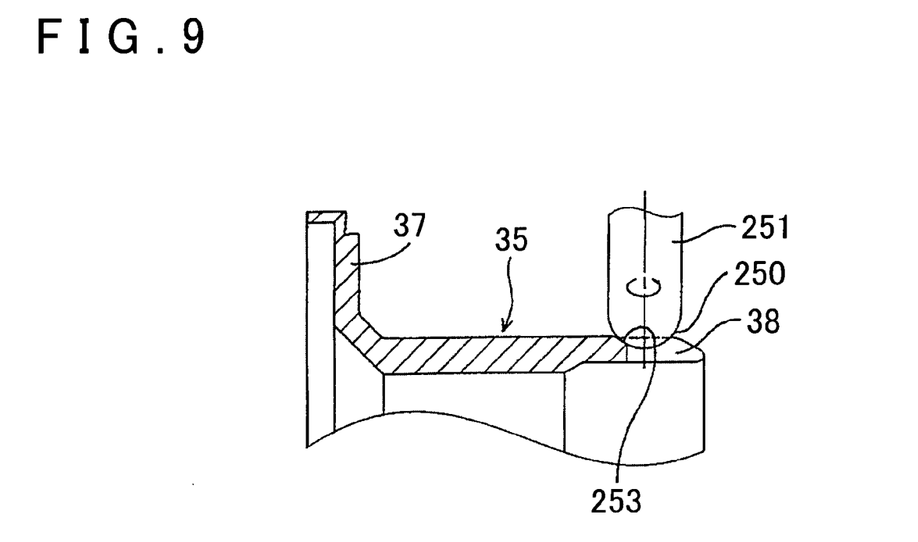
FIG. 9 is a view showing a further exemplary method of fashioning a chamfer portion of an impeller hub.

FIG. 9 shows a further exemplary embodiment of the present invention, in which an end mill 251 having a blade constituted by a spherical surface 250 on its tip end is disposed at a right angle to the axis of the impeller hub 35, and a first chamfer portion 253 having the shape described above is fashioned by the spherical surface 250. Hence, in this exemplary embodiment, the inclined surface of the first chamfer portion 253 in the axial direction of the impeller hub 35 takes an arc shape matching a part of the spherical surface 250.

Note that in the impeller hub 35 described as an example in the above embodiments, the inclined portion 35c is provided on the outer periphery of an axial position corresponding to the bottom portion of the notch 38 in the impeller hub 35, and by means of the inclined portion 35c, the rear end outer peripheral portion 35a and the front end outer peripheral portion 35b take a smoothly connected form. However, this is merely one example of the shape of the impeller hub 35, and the present invention may be applied to an impeller hub 35 having an outer peripheral surface with a constant diameter, in which the inclined portion 35c is not provided.

Further, in the above embodiments, a plurality of embodiments were described as examples of fashioning methods for forming the first chamfer portion 53, 153, 253 in the shape described above, but the present invention is not limited to the fashioning methods described in these examples.

Further, in the above embodiments, the second chamfer portions 54, 55 are formed simultaneously on the two end outer peripheral edge portions 38b of the notch 38 using the end mill 51 for fashioning the first chamfer portion 53, but the second chamfer portions 54, 55 may be fashioned individually on each of the two end outer peripheral edge portions 38b, or the second chamfer portions 54, 55 may be formed using a different tool to the end mill 51 for fashioning the first chamfer portion 53 or in a different direction.

Furthermore, in the above exemplary embodiments, an example in which a dust lip is used as a lip portion constituting the secondary seal portion was described, but the lip portion is not limited to a dust lip alone, and the present invention may be applied widely to any device in which a lip portion having a tightening margin is provided in the oil seal 40.

The specific structures described in the above exemplary embodiments merely illustrate examples of the present invention. The present invention is not limited to these structures, and may employ various aspects within a scope that does not depart from the main thrust of the present invention.

The automatic transmission and manufacturing method for an impeller hub used therein according to exemplary embodiments of the present invention are suitable for use in an automatic transmission having a speed change apparatus enclosed in a transmission case.

The invention claimed is:

1. An automatic transmission comprising:
a transmission case, a speed change apparatus enclosed in the transmission case, a torque converter having a pump impeller that is connected to and rotated by a drive source and a turbine runner that is connected to an input shaft of the speed change apparatus and rotated in accompaniment with the rotation of the pump impeller, and an oil pump that is driven to rotate by the drive source via the torque converter so as to discharge oil, wherein:
a drive gear of the oil pump is connected to the pump impeller and fitted into a notch formed in an end portion of an impeller hub that extends toward the speed change apparatus in an axial direction thereof;
the impeller hub is supported rotatably on an oil pump wall which is fixed to the transmission case and encloses the drive gear;
an oil seal comprising a lip portion fitted to the impeller hub is mounted between an inner peripheral surface of the oil pump wall and an outer peripheral surface of the impeller hub;
the impeller hub is inserted into the oil seal from the lip portion side thereof with an end portion in which the notch is formed leading and such that the lip portion has a tightening margin relative to the impeller hub; the impeller hub has a first chamfer portion formed in a bottom portion outer peripheral edge portion of the notch as an inclined surface that decreases radially in an axial direction of the impeller hub toward an end portion of the impeller hub;
a width of the first chamfer portion in the axial direction increases from sides of the notch circumferentially toward a central portion of the notch; and
wherein the first chamfer portion has a recessed curved surface.

2. The automatic transmission according to claim 1, wherein a second chamfer portion connected to the first chamfer portion is formed on two end outer peripheral edge portions of the notch.

3. The automatic transmission according to claim 2, wherein a bearing for supporting the impeller hub is disposed radially between the inner peripheral surface of the oil pump wall and the outer peripheral surface of the impeller hub and axially between the pump impeller and the notch, and a chamfer width of the first chamfer portion in the axial direction of the impeller hub is set between 1/10 and 1/50 of a diameter of the impeller hub in a groove center of the notch.

4. The automatic transmission according to claim 1, wherein a bearing for supporting the impeller hub is disposed radially between the inner peripheral surface of the oil pump wall and the outer peripheral surface of the impeller hub and axially between the pump impeller and the notch, and a chamfer width of the first chamfer portion in the axial direction of the impeller hub is set between 1/10 and 1/50 of a diameter of the impeller hub in a groove center of the notch.

5. A manufacturing method for an impeller hub used in an automatic transmission comprising a transmission case, a speed change apparatus enclosed in the transmission case, a torque converter having a pump impeller that is connected to and rotated by a drive source and a turbine runner that is connected to an input shaft of the speed change apparatus and rotated in accompaniment with the rotation of the pump impeller, and an oil pump that is driven to rotate by the drive source via the torque converter so as to discharge oil, wherein
a drive gear of the oil pump is connected to the pump impeller and fitted into a notch formed in an end portion of an impeller hub that extends toward the speed change apparatus in an axial direction thereof, the method comprising:

moving a rotary blade having a conical surface on a tip end portion thereof relative to the impeller hub at an incline of a predetermined angle to an axis of the impeller hub to provide a first chamfer portion in a bottom portion outer peripheral edge portion of the notch by the conical surface of the rotary blade such that a width of the first chamfer portion in the axial direction increases from sides of the notch circumferentially toward a central portion of the notch, and wherein the first chamfer portion has a recessed curved surface.

6. The manufacturing method for an impeller hub used in an automatic transmission according to claim 5, wherein the rotary blade relative to the impeller hub is moved in an axial direction of the impeller hub, such that the second chamfer portion is fashioned on two end outer peripheral edge portions of the notch in the impeller hub by a cylindrical portion outer periphery of the rotary blade, and at a terminal end portion of the relative motion of the rotary blade, the first chamfer portion is fashioned continuously in the bottom portion outer peripheral edge portion of the notch in the impeller hub by the conical surface of the rotary blade.

7. The manufacturing method for an impeller hub used in an automatic transmission according to claim 6, wherein an angle of incline of the rotary blade relative to the axis of the impeller hub is set between 40 and 80°, and a cone angle of the conical surface of the rotary blade is set between 130 and 170°.

8. The manufacturing method for an impeller hub used in an automatic transmission according to claim 5, wherein an angle of incline of the rotary blade relative to the axis of the impeller hub is set between 40 and 80°, and a cone angle of the conical surface of the rotary blade is set between 130 and 170°.

* * * * *